United States Patent [19]

Rhoades

[11] Patent Number: 4,833,999
[45] Date of Patent: May 30, 1989

[54] PORTABLE FILLETING TABLE

[76] Inventor: Melvin F. Rhoades, 201 Hill St., Gray Summit, Mo. 63039

[21] Appl. No.: 234,798

[22] Filed: Aug. 22, 1988

[51] Int. Cl.⁴ .............................................. A47B 3/00
[52] U.S. Cl. .................................... 108/38; 108/150; 108/153; 248/159; 248/415
[58] Field of Search ............... 248/158, 159, 165, 415; 108/34, 38, 150, 153

[56] References Cited

U.S. PATENT DOCUMENTS

| | | | |
|---|---|---|---|
| 1,043,387 | 11/1912 | Astruck | 211/196 X |
| 1,072,060 | 9/1913 | Thompson | 108/34 X |
| 1,325,164 | 12/1919 | Mowrey | 108/34 |
| 1,626,293 | 4/1927 | Mason | 108/34 |
| 1,839,783 | 1/1932 | Bloom | 108/34 X |
| 2,233,806 | 3/1941 | Bucknell | 248/165 X |
| 2,568,534 | 9/1951 | Baker | 108/150 X |
| 3,139,256 | 6/1964 | Dodds | 248/165 X |
| 3,176,676 | 4/1965 | Caldwell | 108/150 X |
| 3,503,094 | 3/1970 | Kennedy | |
| 3,885,829 | 5/1975 | Haeger | 108/38 X |
| 3,936,109 | 2/1976 | Richardson | 108/150 X |
| 4,379,432 | 4/1983 | Grossman | 108/153 |
| 4,389,946 | 6/1983 | Hwang | 108/38 X |
| 4,634,090 | 1/1987 | Currie et al. | 248/165 X |

Primary Examiner—Alvin C. Chin-Shue
Assistant Examiner—David L. Talbott
Attorney, Agent, or Firm—Glenn K. Robbins

[57] ABSTRACT

A portable filleting table is provided consisting of a table top and base, which connect together when used as the two halves of a carrying case. Telescopic leg elements provide support for the top and the base. The table top and bottom are each recessed on one side to provide for carrying space when they are joined together in the carrying case mode. The table top and base may be rotated with respect to one another as desired.

5 Claims, 2 Drawing Sheets

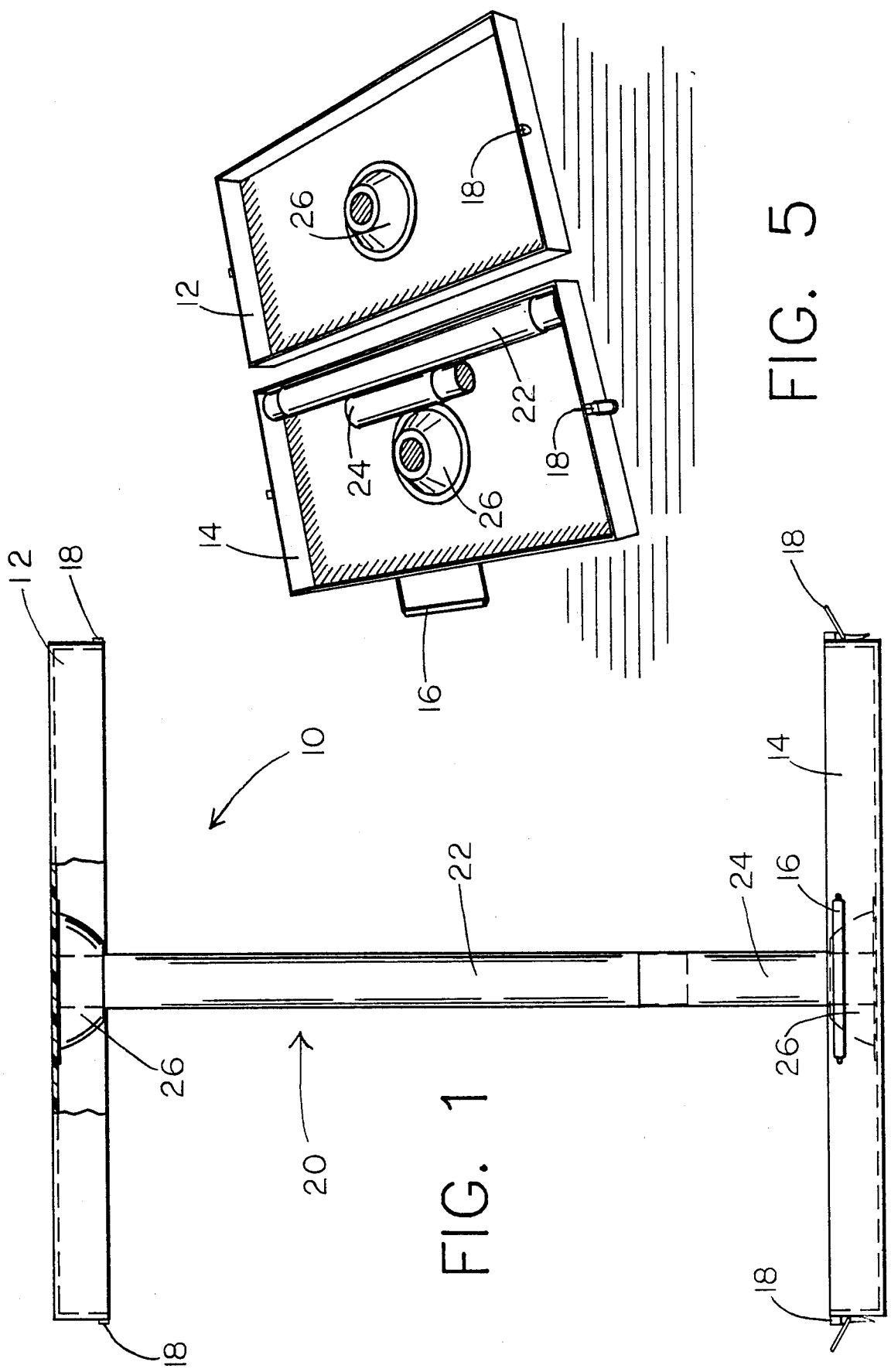

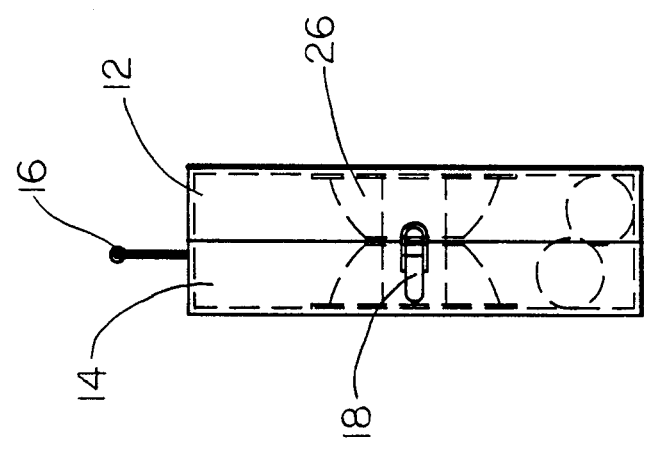
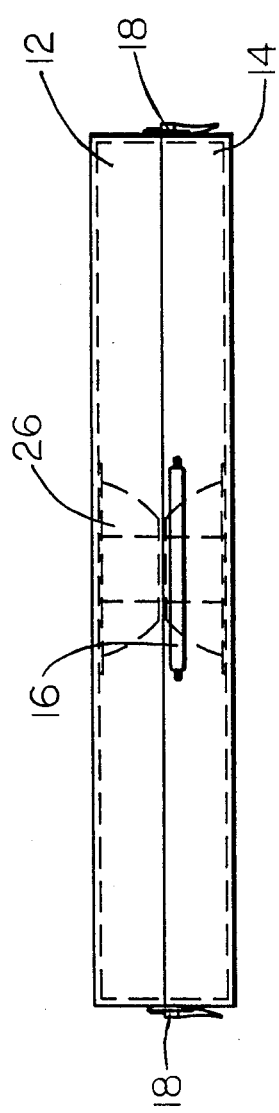
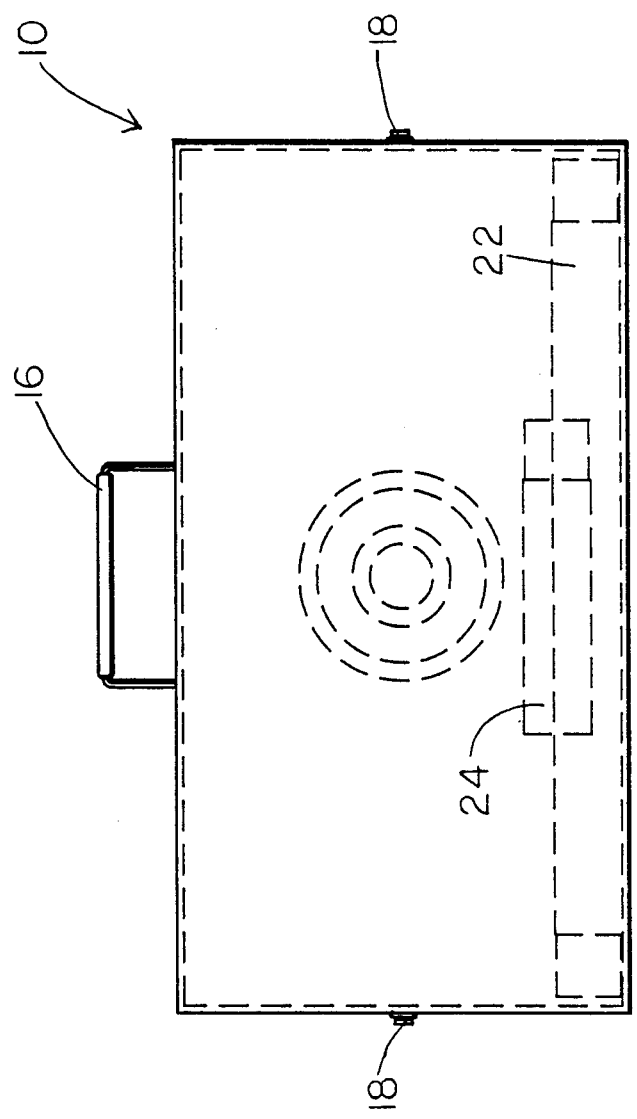

PORTABLE FILLETING TABLE

BACKGROUND OF THE INVENTION

Fishing is a sport that is enjoyed in the great outdoors. In the hopes of catching the big fish, many anglers like to find a secluded area far from the beaten path. This will necessarily take them far from the comforts and conveniences of modern civilization. Although this is desirable for catching the fish, it makes it quite inconvenient when it comes time to clean the day's catch. After the fish is caught it is necessary to clean the fish so it will not spoil. At the same time it is desirable to fillet the fish, which is a popular way to prepare it for eating.

The act of fish filleting is best performed on a hard, flat surface such as a table. However, on camping trips, where economy of space and convenience of transportation is important, a table might not be brought along. There have been provided in the prior art tables which fold up into a carrying case for ready transportation but provide for no additional space within the case for the storage and carriage of other materials.

While there have been portable tables for fish cleaning, it would still be desirable to have table which could be broken down into a carrying case with sufficient space on the inside for the storage of tools and the like.

SUMMARY OF THE INVENTION

By means of this invention there has been provided a portable filleting table in the form of a carrying case. Further, there has been provided on the inside of the case sufficient space to store tools necessary in the operation of fish cleaning.

The elements of the portable filleting table include a table top and base, which comprise the sides of the carrying case, and telescopically extending leg elements. The leg elements are supported in sockets connected to the table top and base and provide, through use of one or more of the leg elements, adjustability for the height of the table. The support sockets also allow for relative rotation of the table top and base with respect to one another. The table top and base are joined together in the carrying case mode by a latch attachment. A handle is provided on the outside edge of one of the table elements.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

FIG. 1 is a view in front elevation partly in section of the completely assembled filleting table as it is employed for the purpose of fish filleting;

FIG. 2 is a top plan view of the complete carrying case showing the interior space of the case and leg elements therein;

FIG. 3 is a top view showing the closed carrying case and contents therein;

FIG. 4 is a view in side elevation from the left side of FIG. 2 showing the closed carrying case and contents therein; and FIG. 5 is a pictorial view showing the separate elements of the carrying case when opened.

DESCRIPTION OF THE INVENTION

The portable filleting table of this invention is generally identified by the reference numeral 10 in FIGS. 1-4. It is shown in its operational filleting mode in FIG. 1 and in its carrying case mode in FIGS. 2-4.

The portable filleting table 10 is comprised of table top 12, base support 14 and leg 20. The table top element and base support are essentially identical in design and construction and are interchangeable in function. The only difference is that either element may be equipped with a handle 16. Each of the table top 12 and base support 14 is made of an open-face rectangular box of sufficiently wide dimension to provide a suitable working area for fishing filleting. The construction may be plastic (as shown), wooden or leather with the exterior being sufficiently hard to withstand the wear and tear of filleting fish or the like and resist damage by knife cuts.

The open-face rectangular box of said table top element and base support has sides of sufficient width to define an internal depth. Locking elements 18, such as hasps, are provided on the sides of the rectangular boxes to provide means for engaging the table top element and base support together as a carrying case as best shown in FIGS. 2 and 4.

The table top 12 is supported upon leg 20. Leg 20 is comprised of a tubular member, shown in FIG. 1 to consist of parts 22 and 24 telescopically fitted together. Leg part 22 is longer than leg part 24. Either one or both of the leg parts may be employed as a support leg to provide for different heights of the table. Leg 20 is connected to table top 12 and base support 20 by attachment to sockets 26 as shown in FIG. 1. The sockets 26 are fixed on the interior side of the rectangular boxes of said table top and base support as best shown in FIG. 5. Relative rotation of the table with respect to the base is provided by rotation of the legs within the sockets or of the leg parts 22 and 24.

USE

The portable filleting table of the instant invention is very simply employed as a table whose elements can break down into a compact carrying case. The setting up of the table 10 is very easy due to the minimum amount of separate pieces. Table top 12 and support base 14 are essentially identical in construction, so they may be interchangeable in use. A handle 16 need only be provided on one of them. The table when erected to the position shown in FIG. 1 has a height substantially waist high which provides a convenience in filleting fish. By use of the two leg parts together, or either one of the leg parts 22 or 24, the height of the table may be adjusted. Rotation of the table top with respect to the base is simply effected as desired.

The rectangular boxes of table top 12 and base support 14 are open-faced and have depth so that when they are joined together as a case, sufficient space is provided to accommodate the storage of leg element 20, filleting tools, fishing tackle and other various items as desired. Connection of the case elements is very easily accomplished by means of latches or hasps 18.

It is to be understood that table top 12 and support base 14 may be constructed of plastic, wood or leather or other like materials. Also, tubular leg element 20 and its parts may be made of metal, plastic or the like.

While the use of the table of this invention has been particularly described as for filleting, it will be understood that it may be employed for other uses such as picknicking, card playing, writing and the like as desired.

Various changes and modifications may be made within this invention as will be apparent to those skilled in the art. Such changes and modifications are within the scope and teaching of this invention as defined in the claims appended hereto.

What is claimed is:

1. A portable table comprised of a table top, a base and a leg element, said table top having socket means to receive one end of said leg element, said base having socket means to receive an opposite end of said leg element, said leg element being comprised of an elongated member, each of said table top and base having mating latch means on at least two opposed edges to enable said table top and base to be connected together, said table top and base each being comprised of an open box structure having a flat planar portion and upstanding sides whereby a storage space is defined when said table top and support base are connected together, the table top and base being of substantially similar construction and interchangeable in use as a table top or a base and a storage space is further defined by said base when the table is erected, with the sides of the base extending upwardly, and at least one of said table top and base being provided with a handle on an upstanding side.

2. The portable table of claim 1 in which said leg member is comprised of at least two tubular members which are adapted to be connected together, each of said tubular members being receivable within the socket means of said table top and base whereby the height of the table may be varied.

3. The portable table of claim 1 in which said leg member is rotatable within said socket means to provide for relative rotation of the table with respect to said base.

4. The portable table of claim 1 in which the flat planar portion of the table top has an exterior surface of sufficient hardness to resist scarring by knife cuts or the like when used as a filleting table.

5. The portable table of claim 1 in which said leg member is comprised of at least two tubular members which are adapted to be connected together, each of said tubular members being receivable within the socket means of said table top and base whereby the height of the table may be varied.

* * * * *